United States Patent
A et al.

(10) Patent No.: US 12,375,354 B1
(45) Date of Patent: Jul. 29, 2025

(54) SUPPORTING OUT-OF-BAND CONFIGURATION CHANGES IN SECURITY POLICY MANAGEMENT

(71) Applicant: Juniper Networks, Inc., Sunnyvale, CA (US)

(72) Inventors: Chandrasekhar A, Bengaluru (IN); Jayanthi R, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 9 days.

(21) Appl. No.: 18/473,461

(22) Filed: Sep. 25, 2023

(51) Int. Cl.
*H04L 41/0866* (2022.01)
*H04L 9/40* (2022.01)
*H04L 41/0813* (2022.01)

(52) U.S. Cl.
CPC ...... *H04L 41/0866* (2013.01); *H04L 41/0813* (2013.01); *H04L 63/20* (2013.01)

(58) Field of Classification Search
None
See application file for complete search history.

(56) References Cited

U.S. PATENT DOCUMENTS

| 7,668,943 | B2 | 2/2010 | Liu |
| 8,060,592 | B1 | 11/2011 | Watsen et al. |
| 10,278,112 | B1* | 4/2019 | A ........... H04L 41/0866 |

FOREIGN PATENT DOCUMENTS

WO    2012/045250 A1    4/2012

* cited by examiner

*Primary Examiner* — Fadi Haj Said
(74) *Attorney, Agent, or Firm* — Harrity & Harrity, LLP

(57) ABSTRACT

A device may receive a configuration of a network device, where the configuration includes configuration blocks with references to high level objects. The device may receive an out-of-band configuration change from the network device, and may compare the out-of-band configuration change and the configuration to identify an impacted high level object. The device may determine an impacted reference and an impacted configuration block associated with the impacted high level object, and may determine whether to reject the out-of-band configuration change, accept the out-of-band configuration change, or merge the out-of-band configuration change with the configuration based on the impacted high level object, the impacted reference, and the impacted configuration block. The device may perform one or more actions based on determining whether to reject the out-of-band configuration change, accept the out-of-band configuration change, or merge the out-of-band configuration change with the configuration.

20 Claims, 12 Drawing Sheets

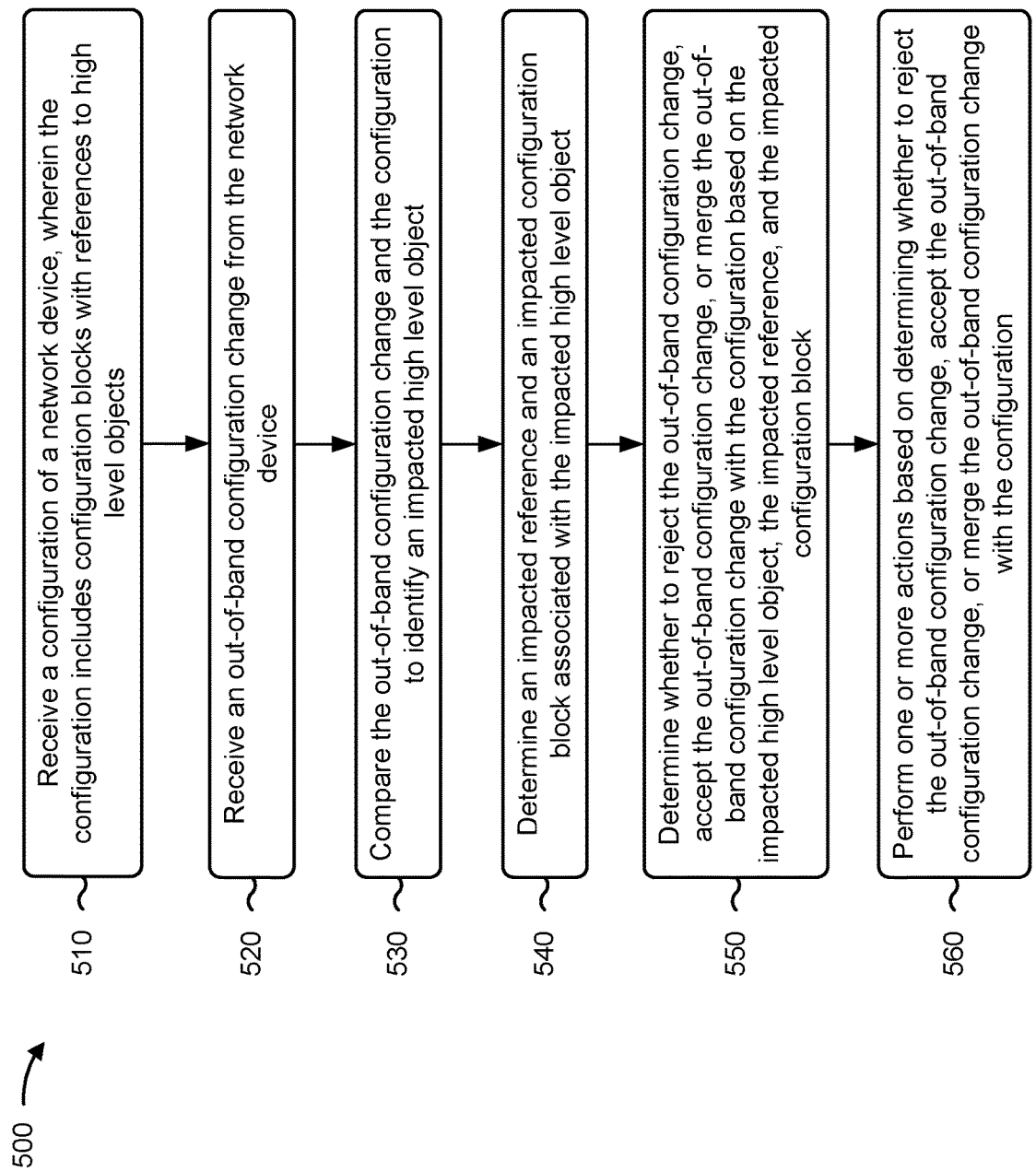

SUPPORTING OUT-OF-BAND CONFIGURATION CHANGES IN SECURITY POLICY MANAGEMENT

BACKGROUND

An out-of-band (OOB) network device configuration change is a change that a customer makes to a network device configuration through any method other than deploying the configuration change from a network management system.

SUMMARY

Some implementations described herein relate to a method. The method may include receiving a configuration of a network device, wherein the configuration includes configuration blocks with references to high level objects. The method may include receiving an out-of-band configuration change from the network device, and comparing the out-of-band configuration change and the configuration to identify an impacted high level object. The method may include determining an impacted reference and an impacted configuration block associated with the impacted high level object, and determining whether to reject the out-of-band configuration change, accept the out-of-band configuration change, or merge the out-of-band configuration change with the configuration based on the impacted high level object, the impacted reference, and the impacted configuration block. The method may include performing one or more actions based on determining whether to reject the out-of-band configuration change, accept the out-of-band configuration change, or merge the out-of-band configuration change with the configuration.

Some implementations described herein relate to a device. The device may include one or more memories and one or more processors. The one or more processors may be configured to receive a configuration of a network device, wherein the configuration includes configuration blocks with references to high level objects. The one or more processors may be configured to store the configuration in a data structure associated with the device, and receive an out-of-band configuration change from the network device. The one or more processors may be configured to retrieve the configuration from the data structure based on receiving the out-of-band configuration change, and compare the out-of-band configuration change and the configuration to identify an impacted high level object. The one or more processors may be configured to determine an impacted reference and an impacted configuration block associated with the impacted high level object, and determine whether to reject the out-of-band configuration change, accept the out-of-band configuration change, or merge the out-of-band configuration change with the configuration based on the impacted high level object, the impacted reference, and the impacted configuration block. The one or more processors may be configured to perform one or more actions based on determining whether to reject the out-of-band configuration change, accept the out-of-band configuration change, or merge the out-of-band configuration change with the configuration.

Some implementations described herein relate to a non-transitory computer-readable medium that stores a set of instructions. The set of instructions, when executed by one or more processors of a device, may cause the device to receive a configuration of a network device, wherein the configuration includes configuration blocks with references to high level objects. The set of instructions, when executed by one or more processors of the device, may cause the device to receive an out-of-band configuration change from the network device, and determine a difference between the out-of-band configuration change and the configuration. The set of instructions, when executed by one or more processors of the device, may cause the device to identify an impacted high level object based on the difference between the out-of-band configuration change and the configuration, and determine an impacted reference and an impacted configuration block associated with the impacted high level object. The set of instructions, when executed by one or more processors of the device, may cause the device to determine whether to reject the out-of-band configuration change, accept the out-of-band configuration change, or merge the out-of-band configuration change with the configuration based on the impacted high level object, the impacted reference, and the impacted configuration block. The set of instructions, when executed by one or more processors of the device, may cause the device to perform one or more actions based on determining whether to reject the out-of-band configuration change, accept the out-of-band configuration change, or merge the out-of-band configuration change with the configuration.

BRIEF DESCRIPTION OF THE DRAWINGS

FIG. 5 is a flowchart of an example process for supporting out-of-band configuration changes in security policy management.

DETAILED DESCRIPTION

Figure 1A:
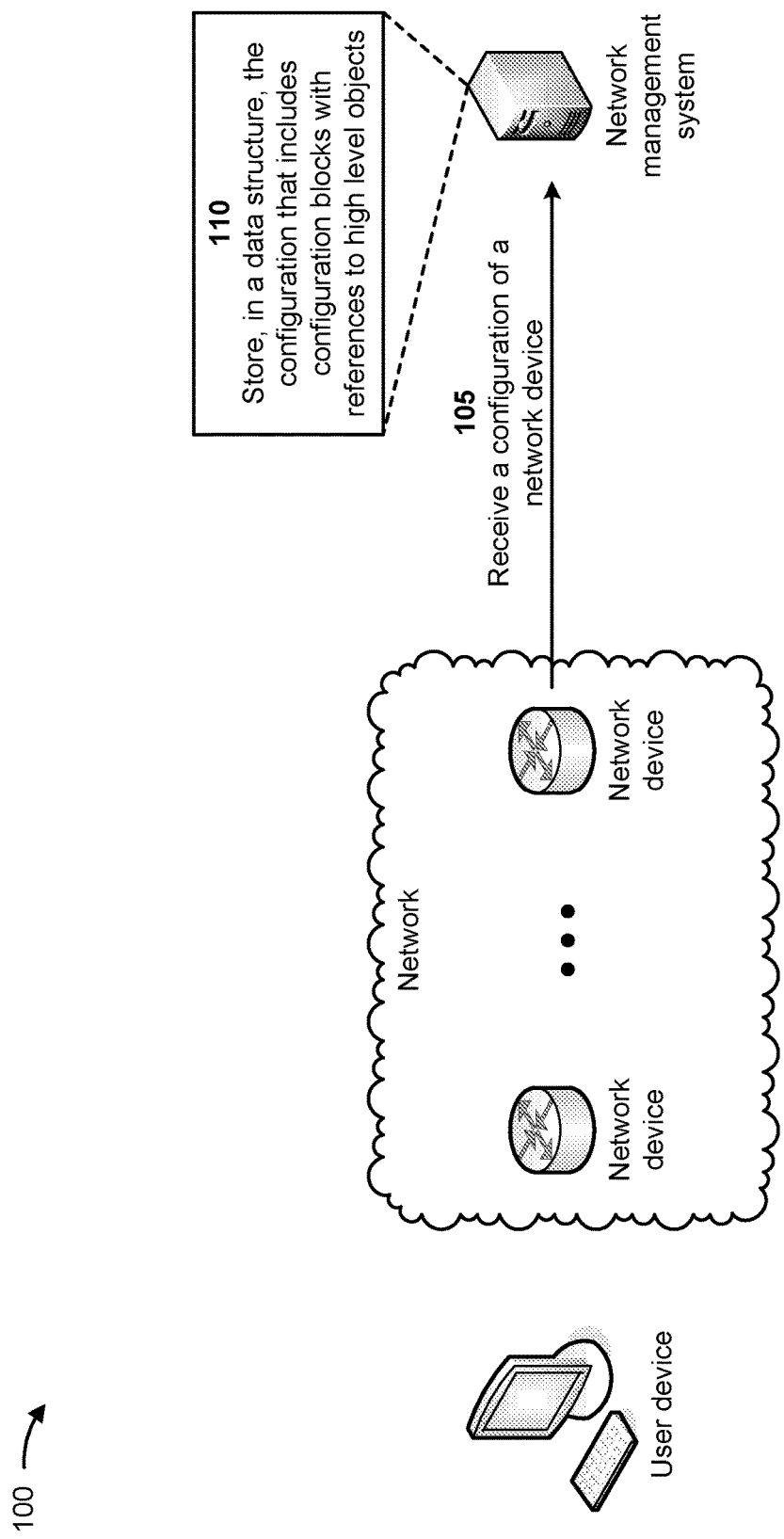
FIGS. 1A-1H are diagrams of an example associated with supporting out-of-band configuration changes in security policy management.

The following detailed description of example implementations refers to the accompanying drawings. The same reference numbers in different drawings may identify the same or similar elements.

An out-of-band configuration change may include a configuration change made by using a command line interface of a network device, using a web-based management interface of a network device, using a network management system not associated with a network device, and/or the like. When a customer makes an out-of-band configuration change, a network management system may be unable to detect the out-of-band configuration change on the network device. The network management system may be unable to set a configuration state of the network device to out of synchronization when the out-of-band configuration change fails to match with a configuration generated by the network management system for the network device. When a configuration state of a network device is set to out of synchronization, the customer may need to synchronize the configuration to return the configuration state of the network device to in synchronization.

Thus, current techniques for managing configurations of a network device consume computing resources (e.g., processing resources, memory resources, communication resources, and/or the like), networking resources, and/or the like, associated with failing to detect out-of-band configuration changes in the network device, failing to identify impacted high level objects associated with the out-of-band configuration changes, failing to identify properties of the impacted high level objects, failing to detect conflicts generated by the out-of-band configuration changes, failing to selectively accept or reject one or more of the out-of-band configuration changes, and/or the like.

Some implementations described herein relate to a device (e.g., a network management system) that supports out-of-band configuration changes in security policy management. For example, the network management system may receive a configuration of a network device, where the configuration includes configuration blocks with references to high level objects. The network management system may receive an out-of-band configuration change from the network device, and may compare the out-of-band configuration change and the configuration to identify an impacted high level object. The network management system may determine an impacted reference and an impacted configuration block associated with the impacted high level object, and may determine whether to reject the out-of-band configuration change, accept the out-of-band configuration change, or merge the out-of-band configuration change with the configuration based on the impacted high level object, the impacted reference, and the impacted configuration block. The network management system may perform one or more actions based on determining whether to reject the out-of-band configuration change, accept the out-of-band configuration change, or merge the out-of-band configuration change with the configuration.

In this way, the network management system supports out-of-band configuration changes in security policy management. For example, the network management system may store a snapshot of a configuration for every network device of a network, where each snapshot may include configuration blocks that are generated from high level objects and each configuration block may include pointers (e.g., references) to the high level objects. When an out-of-band configuration change is made to a network, the network management system may receive a notification of the out-of-band configuration change and the out-of-band configuration change from the network device. The network management system may compare a snapshot associated with the network device and the out-of-band configuration change to identify impacted high level objects. For each high level object, the network management system may identify references associated with the high level object and may mark rules and/or policies associated with the references and the high level objects as out of synchronization. The network management system may selectively accept or reject one or more of the rules and/or policies associated with the out-of-band configuration change.

Thus, the network management system conserves computing resources, networking resources, and/or the like that would otherwise have been consumed by failing to detect out-of-band configuration changes in the network device, failing to identify impacted high level objects associated with the out-of-band configuration changes, failing to identify properties of the impacted high level objects, failing to detect conflicts generated by the out-of-band configuration changes, failing to selectively accept or reject one or more of the out-of-band configuration changes, and/or the like.

FIGS. 1A-1H are diagrams of an example 100 associated with supporting out-of-band configuration changes in security policy management. As shown in FIGS. 1A-1H, example 100 includes a user device and a network management system associated with a network of network devices. Further details of the user device, the network management system, the network, and the network devices are provided elsewhere herein.

As shown in FIG. 1A, and by reference number 105, the network management system may receive a configuration of a network device. For example, the network management system may maintain a device snapshot for every network device of the network. Each device snapshot may include a configuration of a corresponding network device. In some implementations, the configuration may be associated with a security policy for the network device. The configuration may include configuration blocks that are generated from high level objects (e.g., of a high level object-oriented programming language). Each configuration block may include pointers or references of the high level objects that generate the configuration. In some implementations, the network management system may receive the configurations of the network devices from the network devices based on requesting the configurations. In some implementations, the network management system may provision the network devices with the configurations. In such implementations, the network management system need not request the configurations from the network devices. In some implementations, the network management system may continuously receive the configurations from the network devices, may periodically receive the configurations from the network devices, and/or the like. In some implementations, one or more of the configurations of the network devices may be different from each other, may be the same as each other, and/or the like.

An example of a configuration may include the following syntax:

```
<configuration>
  <security>
    <policies>
      <policy>
        <from-zone-name>int</from-zone-name>
        <to-zone-name>tunnel</to-zone-name>
        <policy>
          <name owner= "policy:1234">lo-vpn-policy</name>
          <match>
            <source-address>any</source-address>
            <destination-address>any</destination-address>
            <application>any</application>
          </match>
          <then>
            <permit>
            </permit>
          </then>
        </policy>
      </policy>
    </policies>
  </security>.
```

As further shown in FIG. 1A, and by reference number 110, the network management system may store, in a data structure, the configuration that includes configuration blocks with references to high level objects. For example, the network management system may be associated a data structure (e.g., a database, a table, a list, and/or the like). The network management system may store the configurations of the network devices in the data structure associated with the network management system. As described above, each configuration may include one or more configuration blocks with one or more references to one or more high level objects.

Figure 1B:
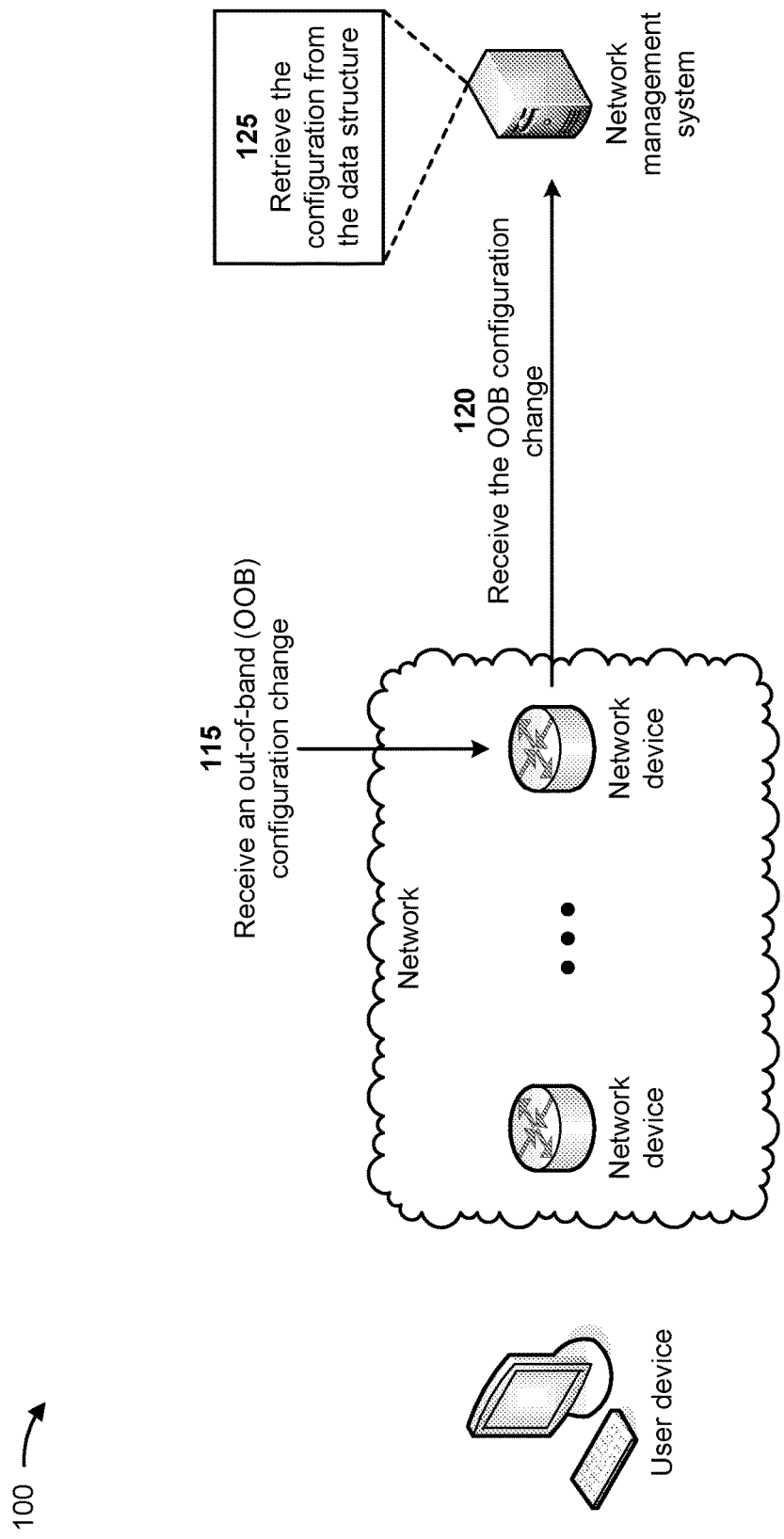

As shown in FIG. 1B, and by reference number 115, the network device may receive an out-of-band (OOB) configuration change. For example, the OOB configuration change may include a change to the configuration of the network device that is made via any method other than via the network management system. In some implementations, the network device may receive the OOB configuration change via a command line interface (CLI) of the network device, via a web-based management interface of the network device, via a network management system not associated with the network device, and/or the like. The network device may generate a notification of the OOB configuration change based on receiving the OOB configuration change.

As further shown in FIG. 1B, and by reference number 120, the network management system may receive the OOB configuration change from the network device. For example, the network management system may receive, from the network device, the notification of the OOB configuration change. In some implementations, the notification may include the OOB configuration change and the network management system may receive the OOB configuration change from the notification. In some implementations, the network device may not generate a notification but may provide the OOB configuration change to the network management system when the OOB configuration change is received by the network device. In some implementations, the network management system may request and receive the OOB configuration change from the network device based on receiving the notification of the OOB configuration change from the network device.

As further shown in FIG. 1B, and by reference number 125, the network management system may retrieve the configuration from the data structure. For example, when the network management system receives the OOB configuration change, the network management system may retrieve, from the configurations stored in the data structure, the configuration of the network device associated with the OOB configuration change. The network management system may retrieve the configuration of the network device so that the network management system may compare the OOB configuration change and the configuration to identify any issues associated with the OOB configuration change.

Figure 1C:
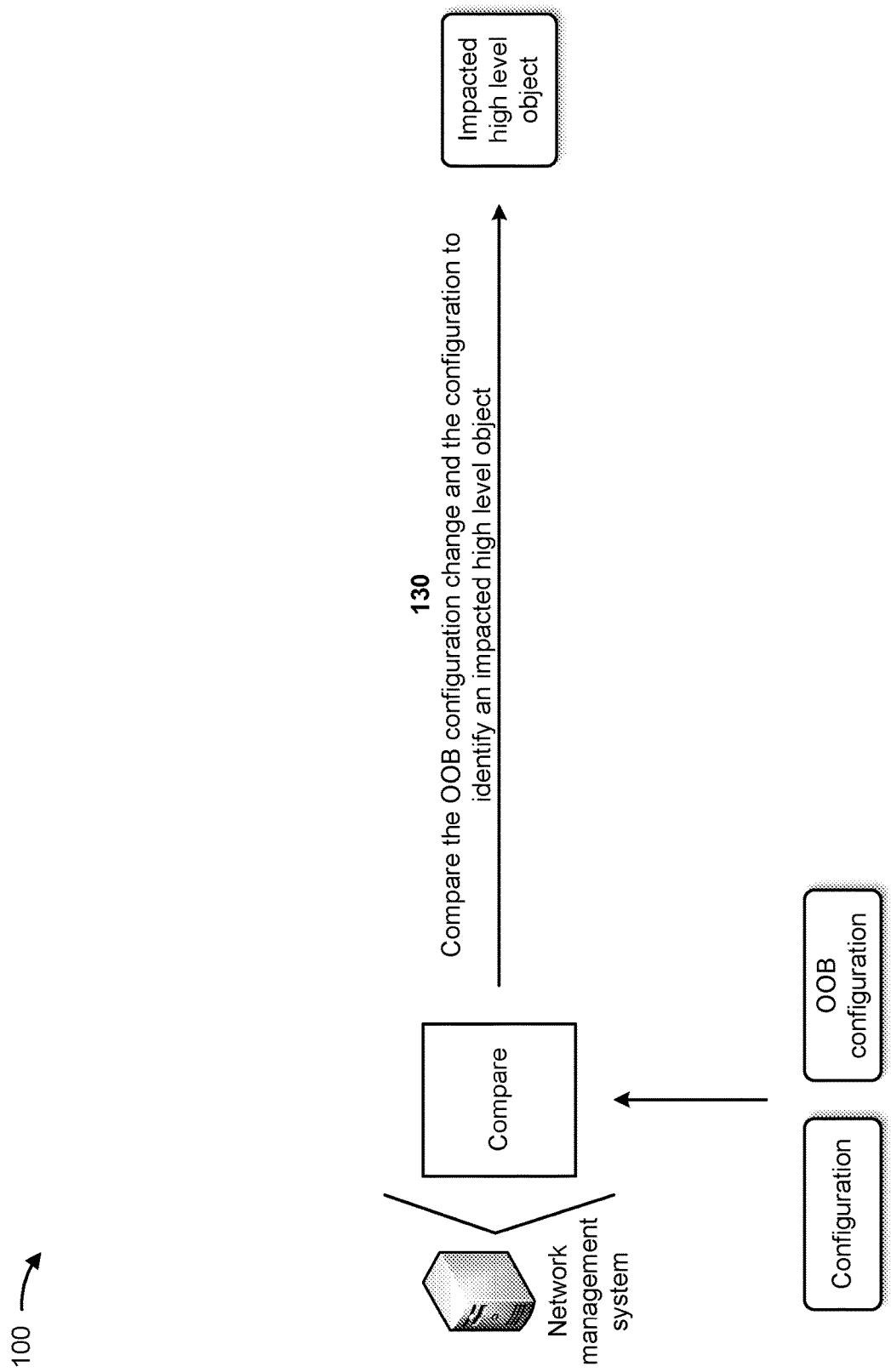

As shown in FIG. 1C, and by reference number 130, the network management system may compare the OOB configuration change and the configuration to identify an impacted high level object. For example, the network management system may compare the OOB configuration change and the configuration to identify resources (e.g., high level objects) of the configuration that are impacted by the OOB configuration change. In some implementations, the network management system may identify a high level object (e.g., the impacted high level object) of the configuration that is impacted by the OOB configuration change based on comparing the OOB configuration change and the configuration. In some implementations, when comparing the OOB configuration change and the configuration to identify the impacted high level object, the network management system may determine a difference (e.g., a delta) between the OOB configuration change and the configuration, and may identify the impacted high level object based on the difference between the OOB configuration change and the configuration.

Figure 1D:
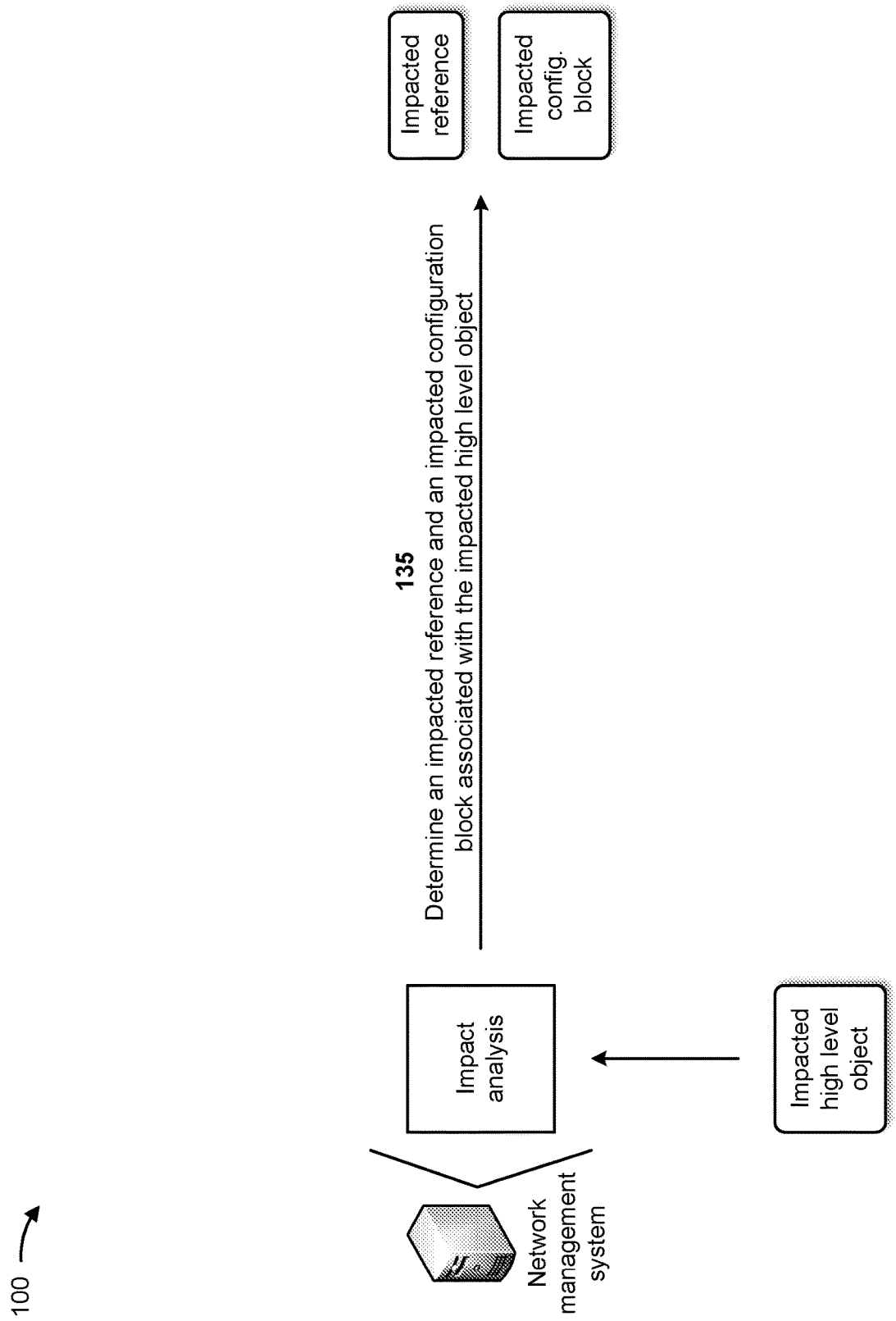

As shown in FIG. 1D, and by reference number 135, the network management system may determine an impacted reference and an impacted configuration block associated with the impacted high level object. For example, for each impacted high level object identified, the network management system may recursively determine one or more impacted references and/or one or more impact configuration blocks associated with the impacted high level object. In some implementations, the network management system may determine the impacted reference and the impacted configuration block associated with the impacted high level object. For example, an antispam high level object may be referenced in a unified threat management configuration block, and the unified threat management configuration block may be referenced in one or more rules.

In some implementations, the network management system may mark the impacted reference and the impacted configuration block associated with the impacted high level object as being out of synchronization. In some implementations, the network management system may generate a user interface that includes a high level model representing the impacted reference, the impacted configuration block, and the impacted high level object, and may provide the user interface for display. For example, the network management system may provide the user interface to the user device and the user device may display the user interface to a user of the user device. The high level model may include indications (e.g., markings) for one or more impacted references, one or more impacted configuration blocks, and/or one or more impacted high level objects that are out of synchronization. In this way, a user may visually analyze the one or more impacted references, the one or more impacted configuration blocks, and/or the one or more impacted high level objects caused by the OOB configuration change.

Figure 1E:
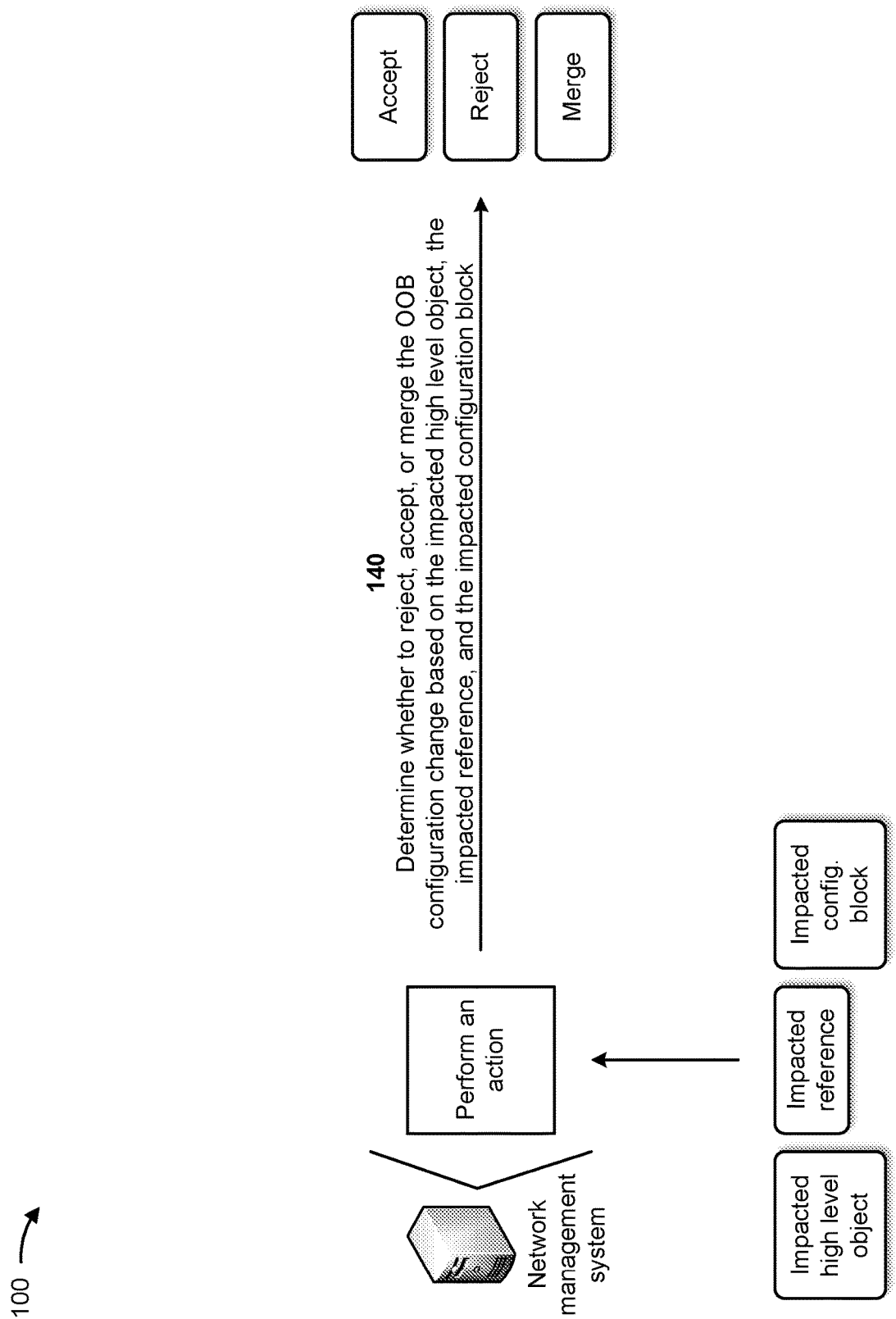

As shown in FIG. 1E, and by reference number 140, the network management system may determine whether to reject the OOB configuration change, accept the OOB configuration change, or merge the OOB configuration change with the configuration based on the impacted high level object, the impacted reference, and the impacted configuration block. For example, the network management system may determine to reject the OOB configuration change based on the impacted high level object, the impacted reference, and/or the impacted configuration block. Alternatively, the network management system may determine to accept the OOB configuration change based on the impacted high level object, the impacted reference, and/or the impacted configuration block. Alternatively, the network management system may determine to merge the OOB configuration change with the configuration based on the impacted high level object, the impacted reference, and/or the impacted configuration block.

In some implementations, the network management system may enable a user to selectively accept the OOB configuration change, reject the OOB configuration change, or merge the OOB configuration change with the configuration based on determining whether to reject the OOB configuration change, accept the OOB configuration change, or merge the OOB configuration change with the configuration.

Figure 1F:
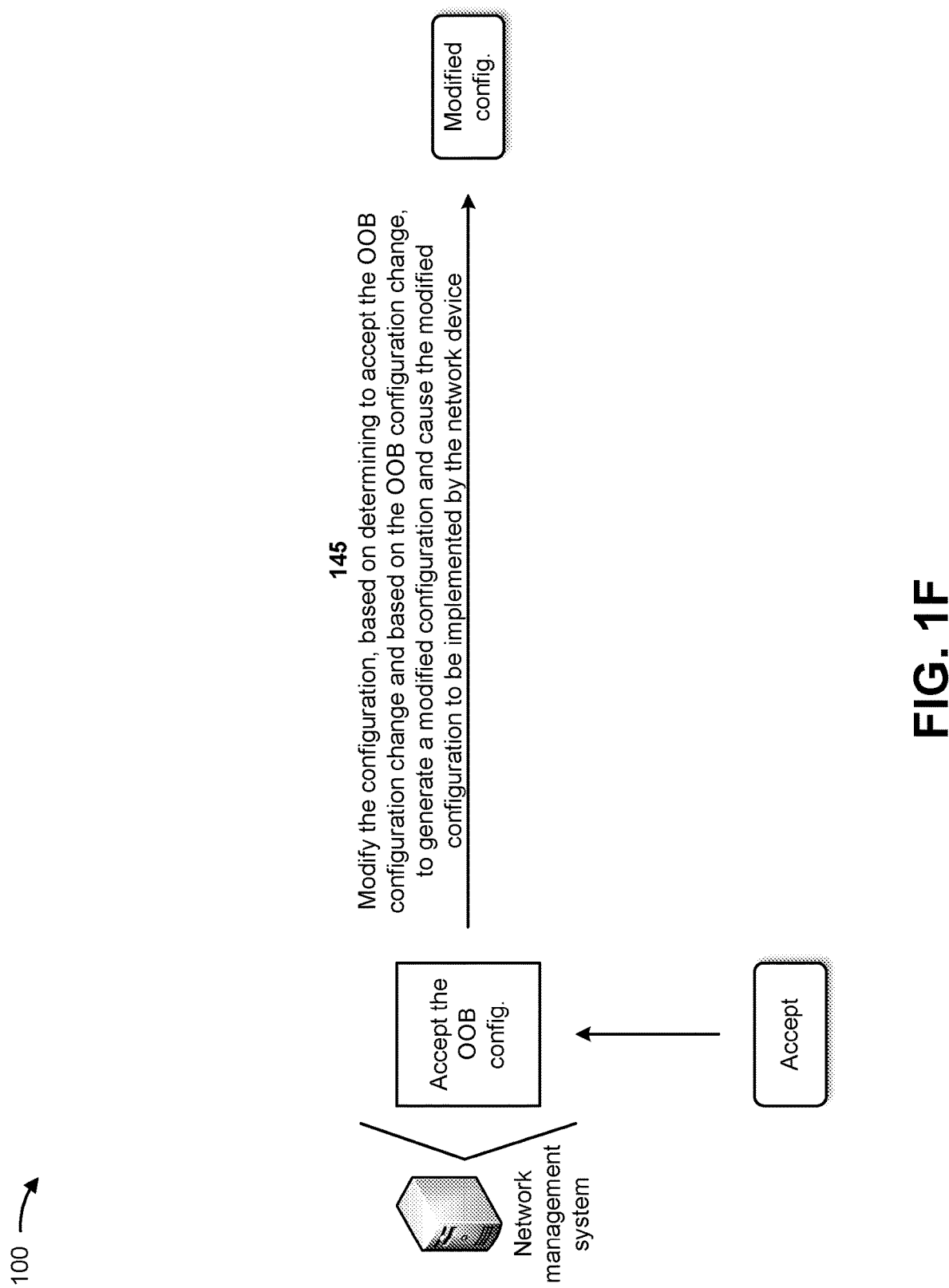

As shown in FIG. 1F, and by reference number 145, the network management system may modify the configuration, based on determining to accept the OOB configuration change and based on the OOB configuration change, to generate a modified configuration, and the network management system may cause the modified configuration to be implemented by the network device. For example, when the network management system determines to accept the OOB configuration change, the network management system may modify the configuration, based on the OOB configuration change (e.g., by adding the OOB configuration change to the configuration, by making the OOB configuration change in the configuration, and/or the like), to generate a modified configuration and may cause the modified configuration to be implemented by the network device. In such an example, the network management system may provide the modified configuration to the network device and may instruct the network device to implement the modified configuration. The network device may implement the modified configuration based on the instruction from the network management system.

In some implementations, when the network management system determines to accept the OOB configuration change, the network management system may create a new high level object, from the configuration, to generate a modified configuration, and may cause the modified configuration to be implemented by the network device. In such implementations, the network management system may provide the modified configuration to the network device and may instruct the network device to implement the modified configuration. The network device may implement the modified configuration based on the instruction from the network management system.

Figure 1G:
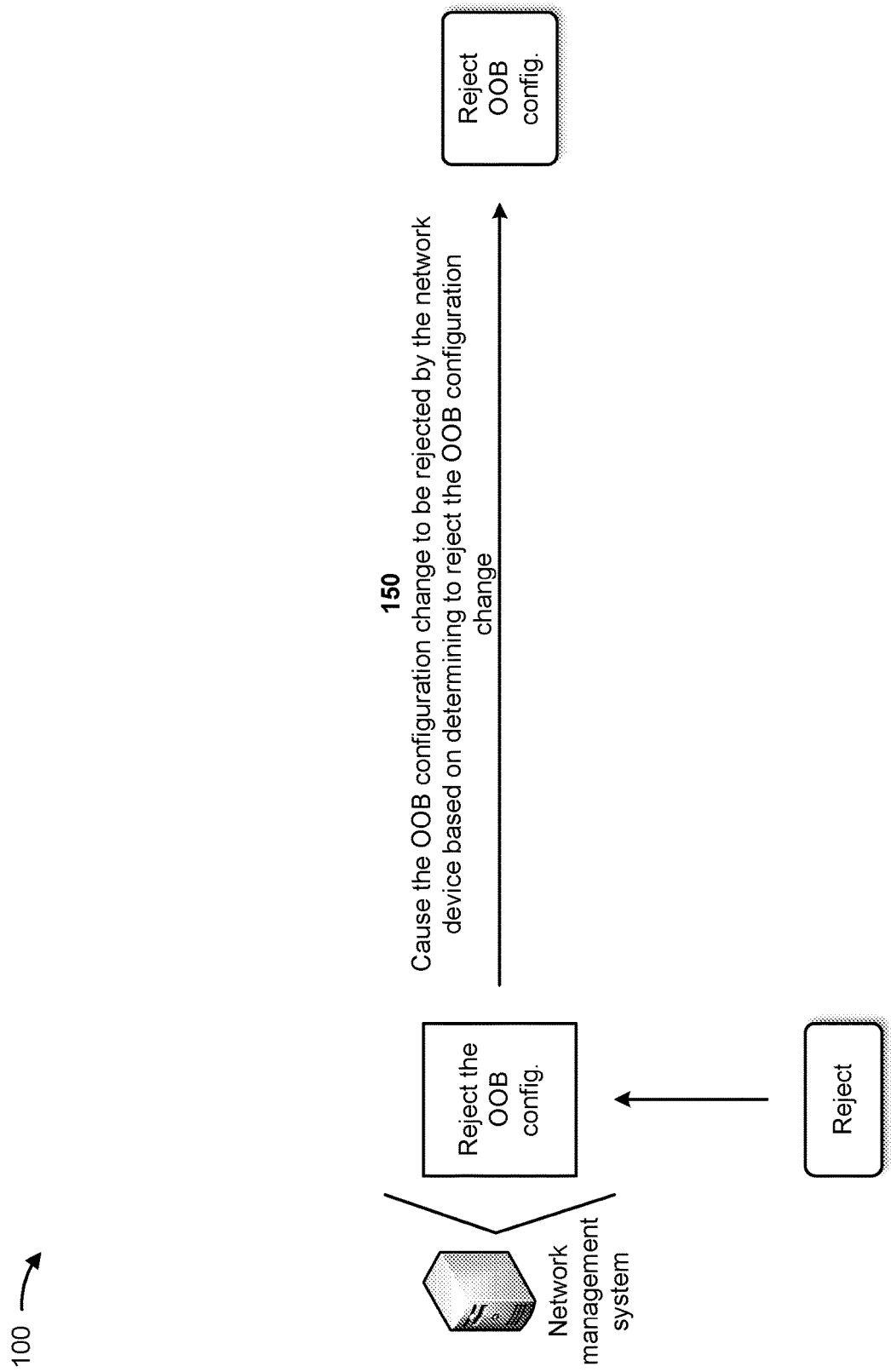

As shown in FIG. 1G, and by reference number 150, the network management system may cause the OOB configuration change to be rejected by the network device based on determining to reject the OOB configuration change. For example, when the network management system determines to reject the OOB configuration change, the network management system may cause the OOB configuration change to be rejected by the network device. In some implementations, the network management system may instruct the network device to the reject OOB configuration change and revert back to the configuration. The network device may reject OOB configuration change and revert back to the configuration based on the instruction from the network management system.

Figure 1H:
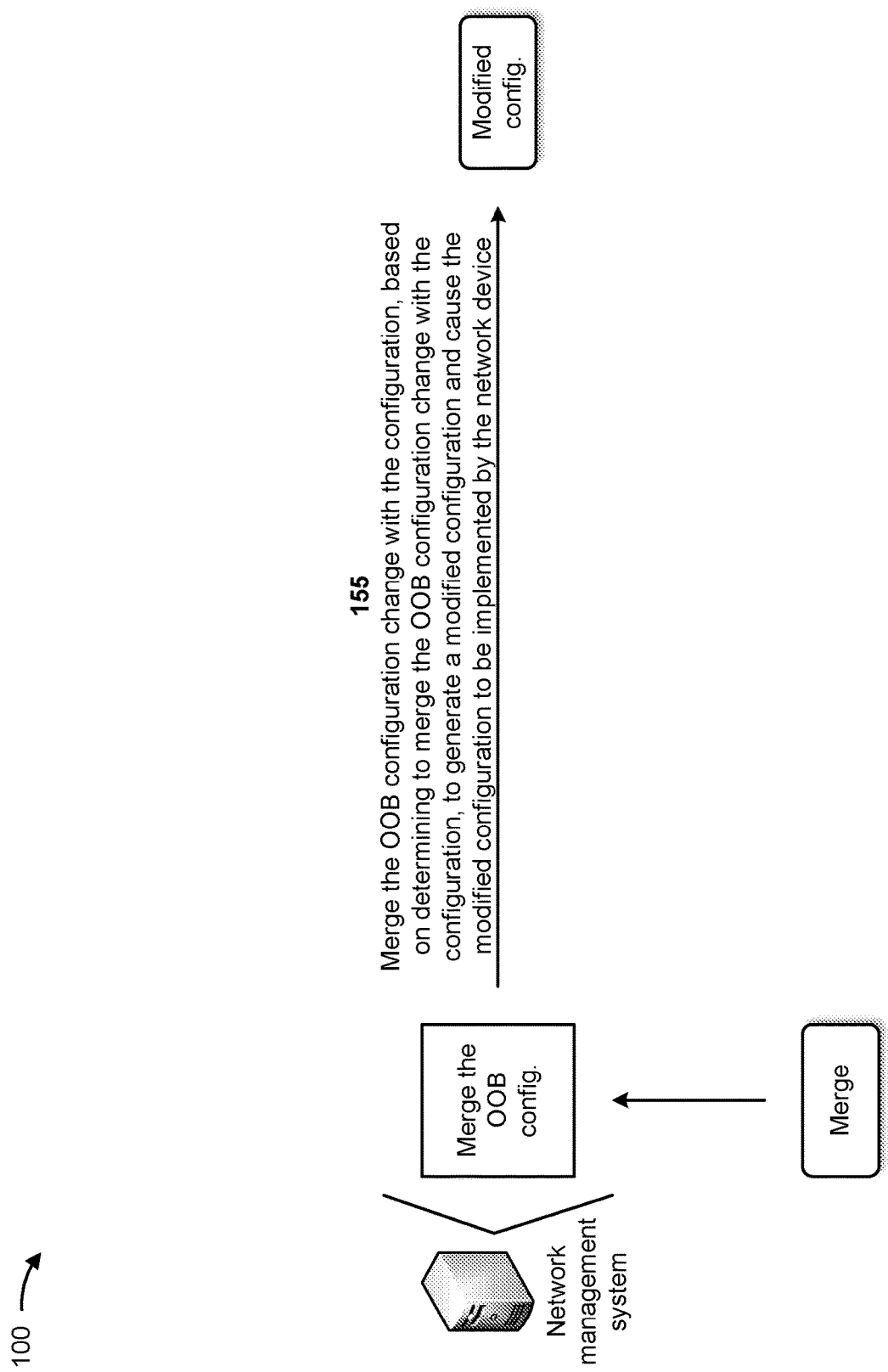

As shown in FIG. 1H, and by reference number 155, the network management system may merge the OOB configuration change with the configuration, based on determining to merge the OOB configuration change with the configuration, to generate a modified configuration, and the network management system may cause the modified configuration to be implemented by the network device. For example, when the network management system determines to merge the OOB configuration change with the configuration, the network management system may merge the OOB configuration change with the configuration to generate a modified configuration, and may cause the modified configuration to be implemented by the network device. In such an example, the network management system may provide the modified configuration to the network device and may instruct the network device to implement the modified configuration. The network device may implement the modified configuration based on the instruction from the network management system.

In some implementations, when the network management system determines to merge the OOB configuration change with the configuration, the network management system may create a new high level object from the configuration, and may merge the impacted high level object and the new high level object to generate a modified configuration. The network management system may cause the modified configuration to be implemented by the network device. In such implementations, the network management system may provide the modified configuration to the network device and may instruct the network device to implement the modified configuration. The network device may implement the modified configuration based on the instruction from the network management system.

In this way, the network management system supports out-of-band configuration changes in security policy management. For example, the network management system may store a snapshot of a configuration for every network device of a network, where each snapshot may include configuration blocks that are generated from high level objects and each configuration block may include pointers (e.g., references) to the high level objects. When an out-of-band configuration change is made to a network, the network management system may receive a notification of the out-of-band configuration change and the out-of-band configuration change from the network device. The network management system may compare a snapshot associated with the network device and the out-of-band configuration change to identify impacted high level objects. For each high level object, the network management system may identify references associated with the high level object and may mark rules and/or policies associated with the references and the high level objects as out of synchronization. The network management system may selectively accept or reject one or more of the rules and/or policies associated with the out-of-band configuration change.

Thus, the network management system conserves computing resources, networking resources, and/or the like that would otherwise have been consumed by failing to failing to detect out-of-band configuration changes in the network device, failing to identify impacted high level objects associated with the out-of-band configuration changes, failing to identify properties of the impacted high level objects, failing to detect conflicts generated by the out-of-band configuration changes, failing to selectively accept or reject one or more of the out-of-band configuration changes, and/or the like.

As indicated above, FIGS. 1A-1H are provided as an example. Other examples may differ from what is described with regard to FIGS. 1A-1H. The number and arrangement of devices shown in FIGS. 1A-1H are provided as an example. In practice, there may be additional devices, fewer devices, different devices, or differently arranged devices than those shown in FIGS. 1A-1H. Furthermore, two or more devices shown in FIGS. 1A-1H may be implemented within a single device, or a single device shown in FIGS. 1A-1H may be implemented as multiple, distributed devices. Additionally, or alternatively, a set of devices (e.g., one or more devices) shown in FIGS. 1A-1H may perform one or more functions described as being performed by another set of devices shown in FIGS. 1A-1H.

Figure 2:
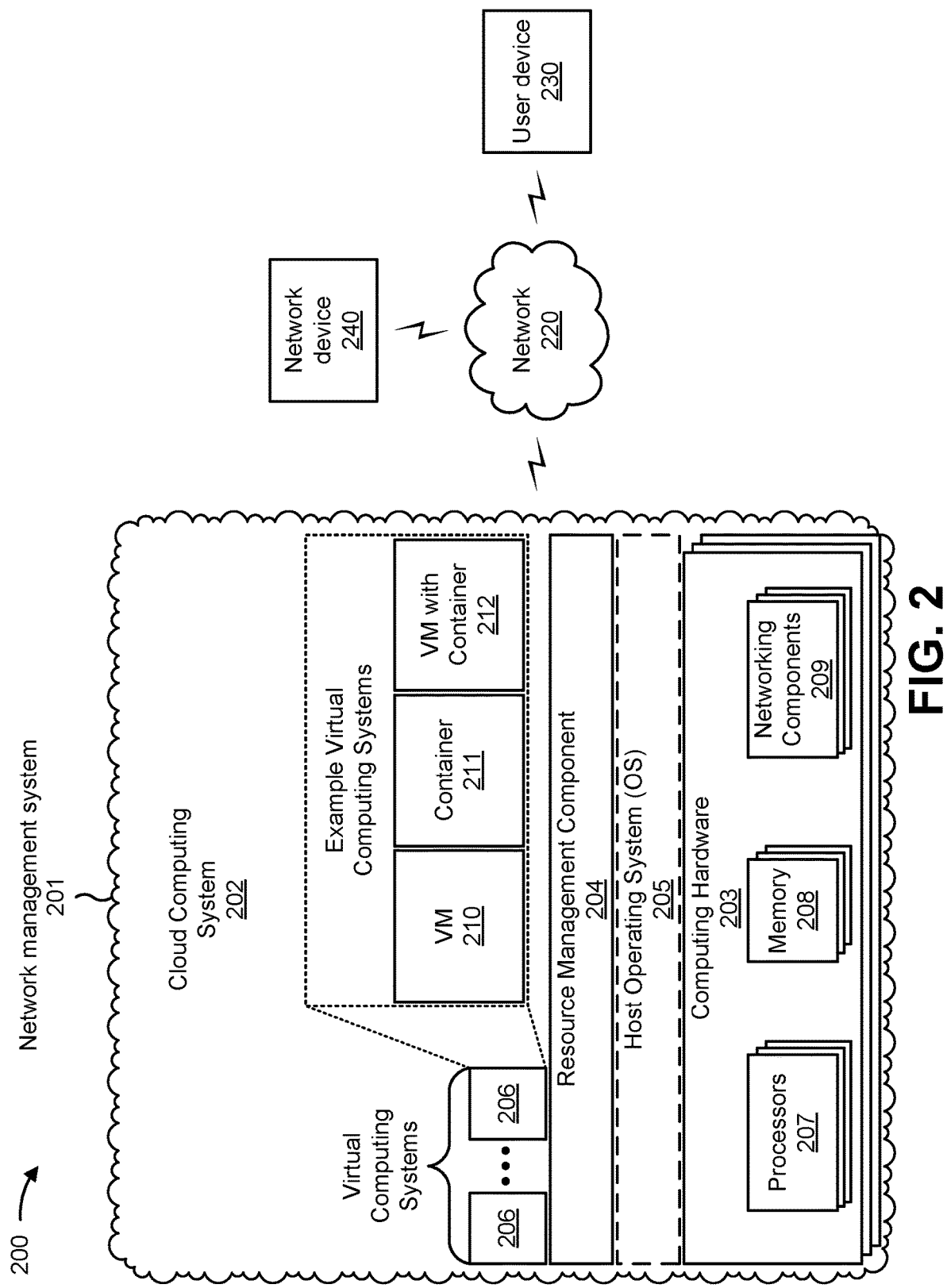
FIG. 2 is a diagram of an example environment in which systems and/or methods described herein may be implemented.

FIG. 2 is a diagram of an example environment 200 in which systems and/or methods described herein may be implemented. As shown in FIG. 2, the environment 200 may include a network management system 201, which may include one or more elements of and/or may execute within a cloud computing system 202. The cloud computing system 202 may include one or more elements 203-212, as described in more detail below. As further shown in FIG. 2, the environment 200 may include a network 220, a user device 230, and/or a network device 240. Devices and/or elements of the environment 200 may interconnect via wired connections and/or wireless connections.

The cloud computing system 202 may include computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of the computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from the computing hardware 203 of the single computing device. In this way, the computing hardware 203 can operate more efficiently, with lower power consumption, higher reliability, higher availability, higher utilization, greater flexibility, and lower cost than using separate computing devices.

The computing hardware 203 may include hardware and corresponding resources from one or more computing devices. For example, the computing hardware 203 may include hardware from a single computing device (e.g., a single server) or from multiple computing devices (e.g., multiple servers), such as multiple computing devices in one or more data centers. As shown, the computing hardware 203 may include one or more processors 207, one or more memories 208, and/or one or more networking components 209. Examples of a processor, a memory, and a networking component (e.g., a communication component) are described elsewhere herein.

The resource management component 204 may include a virtualization application (e.g., executing on hardware, such as the computing hardware 203) capable of virtualizing the computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 210. Additionally, or alternatively, the resource management component 204 may include a container manager, such as when the virtual computing systems 206 are containers 211. In some implementations, the resource management component 204 executes within and/or in coordination with a host operating system 205.

A virtual computing system 206 may include a virtual environment that enables cloud-based execution of operations and/or processes described herein using the computing hardware 203. As shown, a virtual computing system 206 may include a virtual machine 210, a container 211, or a hybrid environment 212 that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although the network management system 201 may include one or more elements 203-212 of the cloud computing system 202, may execute within the cloud computing system 202, and/or may be hosted within the cloud computing system 202, in some implementations, the network management system 201 may not be cloud-based (e.g., may be implemented outside of a cloud computing system) or may be partially cloud-based. For example, the network management system 201 may include one or more devices that are not part of the cloud computing system 202, such as a device 300 of FIG. 3, which may include a standalone server or another type of computing device. The network management system 201 may perform one or more operations and/or processes described in more detail elsewhere herein.

The network 220 may include one or more wired and/or wireless networks. For example, the network 220 may include a cellular network, a public land mobile network (PLMN), a local area network (LAN), a wide area network (WAN), a private network, the Internet, and/or a combination of these or other types of networks. The network 220 enables communication among the devices of the environment 200.

The user device 230 may include one or more devices capable of receiving, generating, storing, processing, and/or providing information, as described elsewhere herein. The user device 230 may include a communication device and/or a computing device. For example, the user device 230 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The network device 240 may include one or more devices capable of receiving, processing, storing, routing, and/or providing traffic (e.g., a packet and/or other information or metadata) in a manner described herein. For example, the network device 240 may include a router, such as a label switching router (LSR), a label edge router (LER), an ingress router, an egress router, a provider router (e.g., a provider edge router or a provider core router), a virtual router, or another type of router. Additionally, or alternatively, the network device 240 may include a gateway, a switch, a firewall, a hub, a bridge, a reverse proxy, a server (e.g., a proxy server, a cloud server, or a data center server), a load balancer, and/or a similar device. In some implementations, the network device 240 may be a physical device implemented within a housing, such as a chassis. In some implementations, the network device 240 may be a virtual device implemented by one or more computing devices of a cloud computing environment or a data center. In some implementations, a group of network devices 240 may be a group of data center nodes that are used to route traffic flow through a network.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
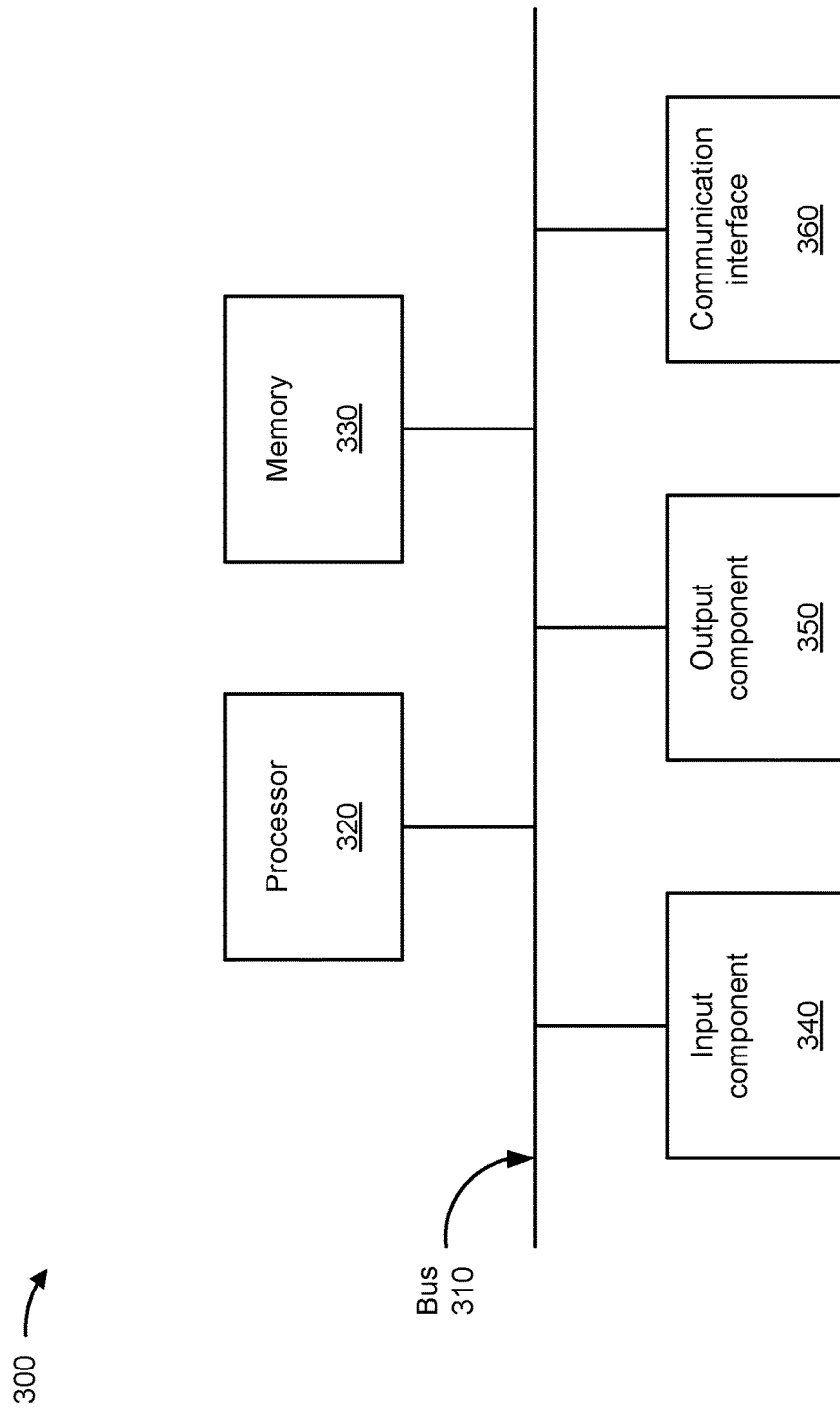
FIGS. 3 and 4 are diagrams of example components of one or more devices of FIG. 2.

FIG. 3 is a diagram of example components of one or more devices of FIG. 2. The example components may be included in a device 300, which may correspond to the network management system 201, the user device 230, and/or the network device 240. In some implementations, the network management system 201, the user device 230, and/or the network device 240 may include one or more devices 300 and/or one or more components of the device 300. As shown in FIG. 3, the device 300 may include a bus 310, a processor 320, a memory 330, an input component 340, an output component 350, and a communication interface 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit (CPU), a graphics processing unit (GPU), a microprocessor, a controller, a microcontroller, a digital signal processor (DSP), a field-programmable gate array (FPGA), an application-specific integrated circuit (ASIC), and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication interface 360 enables the device 300 to communicate with other devices via a wired connection and/or a wireless connection. For example, the communication interface 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
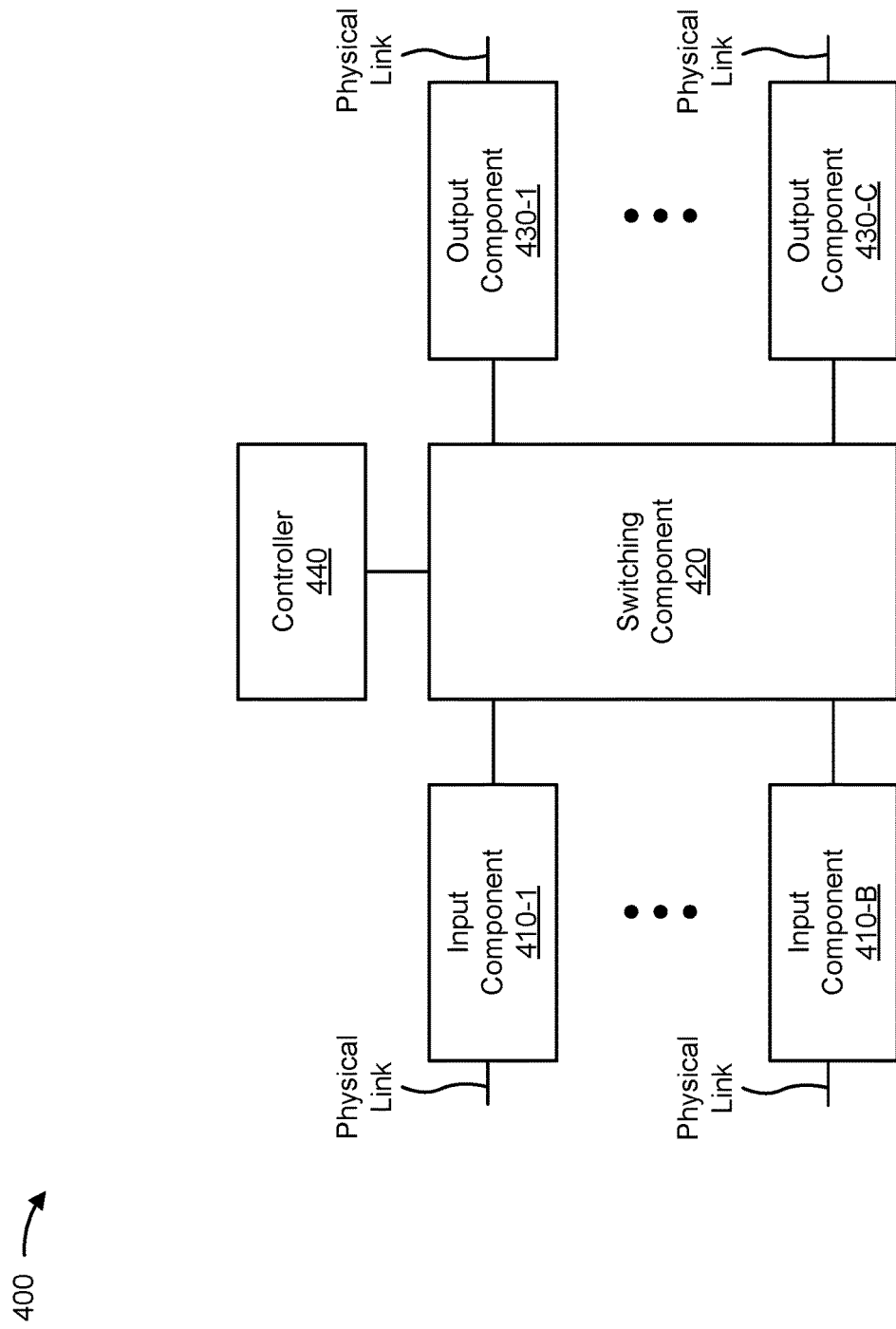

FIG. 4 is a diagram of example components of one or more devices of FIG. 2. The example components may be included in a device 400. The device 400 may correspond to the network device 240. In some implementations, the network device 240 may include one or more devices 400 and/or one or more components of the device 400. As shown in FIG. 4, the device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

The input component 410 may be one or more points of attachment for physical links and may be one or more points of entry for incoming traffic, such as packets. The input component 410 may process incoming traffic, such as by performing data link layer encapsulation or decapsulation. In some implementations, the input component 410 may transmit and/or receive packets. In some implementations, the input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, the device 400 may include one or more input components 410.

The switching component 420 may interconnect the input components 410 with the output components 430. In some implementations, the switching component 420 may be implemented via one or more crossbars, via busses, and/or with shared memories. The shared memories may act as temporary buffers to store packets from the input components 410 before the packets are eventually scheduled for delivery to the output components 430. In some implementations, the switching component 420 may enable the input components 410, the output components 430, and/or the controller 440 to communicate with one another.

The output component 430 may store packets and may schedule packets for transmission on output physical links. The output component 430 may support data link layer encapsulation or decapsulation, and/or a variety of higher-level protocols. In some implementations, the output component 430 may transmit packets and/or receive packets. In some implementations, the output component 430 may include an output line card that includes one or more packet processing components (e.g., in the form of integrated circuits), such as one or more IFCs, packet forwarding components, line card controller components, output ports, processors, memories, and/or output queues. In some implementations, the device 400 may include one or more output components 430. In some implementations, the input component 410 and the output component 430 may be implemented by the same set of components (e.g., and input/output component may be a combination of the input component 410 and the output component 430).

The controller 440 includes a processor in the form of, for example, a CPU, a GPU, an accelerated processing unit (APU), a microprocessor, a microcontroller, a DSP, an FPGA, an ASIC, and/or another type of processor. The processor is implemented in hardware, firmware, or a combination of hardware and software. In some implementations, the controller 440 may include one or more processors that can be programmed to perform a function.

In some implementations, the controller 440 may include a RAM, a ROM, and/or another type of dynamic or static storage device (e.g., a flash memory, a magnetic memory, an optical memory, etc.) that stores information and/or instructions for use by the controller 440.

In some implementations, the controller 440 may communicate with other devices, networks, and/or systems connected to the device 400 to exchange information regarding network topology. The controller 440 may create routing tables based on the network topology information, may create forwarding tables based on the routing tables, and may forward the forwarding tables to the input components 410 and/or output components 430. The input components 410 and/or the output components 430 may use the forwarding tables to perform route lookups for incoming and/or outgoing packets.

The controller 440 may perform one or more processes described herein. The controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with the controller 440 from another computer-readable medium or from another device via a communication interface. When executed, software instructions stored in a memory and/or storage component associated with the controller 440 may cause the controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, the device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

FIG. 5 is a flowchart of an example process 500 for supporting out-of-band configuration changes in security policy management. In some implementations, one or more process blocks of FIG. 5 may be performed by a device (e.g., the network management system 201). In some implementations, one or more process blocks of FIG. 5 may be performed by another device or a group of devices separate from or including the device, such as a network device (e.g., the network device 240). Additionally, or alternatively, one or more process blocks of FIG. 5 may be performed by one or more components of the device 300, such as the processor 320, the memory 330, the input component 340, the output component 350, and/or the communication interface 360.

As shown in FIG. 5, process 500 may include receiving a configuration of a network device, wherein the configuration includes configuration blocks with references to high level objects (block 510). For example, the device may receive a configuration of a network device, as described above. In some implementations, the configuration includes configuration blocks with references to high level objects. In some implementations, the configuration is associated with a security policy for the network device.

As further shown in FIG. 5, process 500 may include receiving an out-of-band configuration change from the network device (block 520). For example, the device may receive an out-of-band configuration change from the network device, as described above.

As further shown in FIG. 5, process 500 may include comparing the out-of-band configuration change and the configuration to identify an impacted high level object (block 530). For example, the device may compare the out-of-band configuration change and the configuration to identify an impacted high level object, as described above. In some implementations, comparing the out-of-band configuration change and the configuration to identify the impacted high level object includes determining a difference between the out-of-band configuration change and the configuration, and identifying the impacted high level object based on the difference between the out-of-band configuration change and the configuration.

As further shown in FIG. 5, process 500 may include determining an impacted reference and an impacted configuration block associated with the impacted high level object (block 540). For example, the device may determine an impacted reference and an impacted configuration block associated with the impacted high level object, as described above.

As further shown in FIG. 5, process 500 may include determining whether to reject the out-of-band configuration change, accept the out-of-band configuration change, or merge the out-of-band configuration change with the configuration based on the impacted high level object, the impacted reference, and the impacted configuration block (block 550). For example, the device may determine whether to reject the out-of-band configuration change, accept the out-of-band configuration change, or merge the out-of-band configuration change with the configuration based on the impacted high level object, the impacted reference, and the impacted configuration block, as described above.

As further shown in FIG. 5, process 500 may include performing one or more actions based on determining whether to reject the out-of-band configuration change, accept the out-of-band configuration change, or merge the out-of-band configuration change with the configuration (block 560). For example, the device may perform one or more actions based on determining whether to reject the out-of-band configuration change, accept the out-of-band configuration change, or merge the out-of-band configuration change with the configuration, as described above. In some implementations, performing the one or more actions includes modifying the configuration, based on determining to accept the out-of-band configuration change and based on the out-of-band configuration change, to generate a modified configuration, and causing the modified configuration to be implemented by the network device. In some implementations, performing the one or more actions includes causing the out-of-band configuration change to be rejected by the network device based on determining to reject the out-of-band configuration change.

In some implementations, performing the one or more actions includes merging the out-of-band configuration change with the configuration, based on determining to merge the out-of-band configuration change with the configuration, to generate a modified configuration, and causing the modified configuration to be implemented by the network device. In some implementations, performing the one or more actions includes creating a new high level object, from the configuration and based on determining to accept the out-of-band configuration change, to generate a modified configuration, and causing the modified configuration to be implemented by the network device. In some implementations, performing the one or more actions includes creating a new high level object from the configuration and based on determining to merge the out-of-band configuration change with the configuration, merging the impacted high level object and the new high level object to generate a modified configuration, and causing the modified configuration to be implemented by the network device.

In some implementations, performing the one or more actions includes enabling a user to selectively accept the out-of-band configuration change, reject the out-of-band configuration change, or merge the out-of-band configuration change with the configuration based on determining whether to reject the out-of-band configuration change, accept the out-of-band configuration change, or merge the out-of-band configuration change with the configuration.

In some implementations, process 500 includes storing the configuration in a data structure associated with the device. In some implementations, process 500 includes retrieving the configuration, from a data structure associated with the device, prior to comparing the out-of-band configuration change and the configuration. In some implementations, process 500 includes marking the impacted reference and the impacted configuration block associated with the impacted high level object as being out of synchronization. In some implementations, process 500 includes generating a user interface that includes a high level model representing the impacted reference, the impacted configuration block, and the impacted high level object, and providing the user interface for display.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    receiving, by a device, a configuration of a network device,
        wherein the configuration includes configuration blocks with references to high level objects that generate the configuration,
        wherein the high level objects are of a high level object-oriented programming language;
    receiving, by the device, an out-of-band configuration change from the network device,
        wherein the out-of-band configuration change is a change to the configuration of the network device;
    comparing, by the device, the out-of-band configuration change and the configuration to identify an impacted high level object;
    determining, by the device, an impacted reference and an impacted configuration block associated with the impacted high level object,
    determining, by the device, whether to reject the out-of-band configuration change, accept the out-of-band configuration change, or merge the out-of-band configuration change with the configuration based on the impacted high level object, the impacted reference, and the impacted configuration block; and
    performing, by the device, one or more actions based on determining whether to reject the out-of-band configuration change, accept the out-of-band configuration change, or merge the out-of-band configuration change with the configuration.

2. The method of claim 1, further comprising:
    storing the configuration in a data structure associated with the device.

3. The method of claim 1, further comprising:
retrieving the configuration, from a data structure associated with the device, prior to comparing the out-of-band configuration change and the configuration.

4. The method of claim 1, wherein performing the one or more actions comprises:
modifying the configuration, based on determining to accept the out-of-band configuration change and based on the out-of-band configuration change, to generate a modified configuration; and
causing the modified configuration to be implemented by the network device.

5. The method of claim 1, wherein performing the one or more actions comprises:
causing the out-of-band configuration change to be rejected by the network device based on determining to reject the out-of-band configuration change.

6. The method of claim 1, wherein performing the one or more actions comprises:
merging the out-of-band configuration change with the configuration, based on determining to merge the out-of-band configuration change with the configuration, to generate a modified configuration; and
causing the modified configuration to be implemented by the network device.

7. The method of claim 1, wherein performing the one or more actions comprises:
creating a new high level object, from the configuration and based on determining to accept the out-of-band configuration change, to generate a modified configuration; and
causing the modified configuration to be implemented by the network device.

8. A device, comprising:
one or more memories; and
one or more processors to:
receive a configuration of a network device,
wherein the configuration includes configuration blocks with references to high level objects that generate the configuration,
wherein the high level objects are of a high level object-oriented programming language;
store the configuration in a data structure associated with the device;
receive an out-of-band configuration change from the network device;
retrieve the configuration from the data structure based on receiving the out-of-band configuration change;
compare the out-of-band configuration change and the configuration to identify an impacted high level object;
determine an impacted reference and an impacted configuration block associated with the impacted high level object;
determine whether to reject the out-of-band configuration change, accept the out-of-band configuration change, or merge the out-of-band configuration change with the configuration based on the impacted high level object, the impacted reference, and the impacted configuration block; and
perform one or more actions based on determining whether to reject the out-of-band configuration change, accept the out-of-band configuration change, or merge the out-of-band configuration change with the configuration.

9. The device of claim 8, wherein the one or more processors, to perform the one or more actions, are to:
create a new high level object from the configuration and based on determining to merge the out-of-band configuration change with the configuration;
merge the impacted high level object and the new high level object to generate a modified configuration; and
cause the modified configuration to be implemented by the network device.

10. The device of claim 8, wherein the one or more processors, to compare the out-of-band configuration change and the configuration to identify the impacted high level object, are to:
determine a difference between the out-of-band configuration change and the configuration; and
identify the impacted high level object based on the difference between the out-of-band configuration change and the configuration.

11. The device of claim 8, wherein the one or more processors are further to:
mark the impacted reference and the impacted configuration block associated with the impacted high level object as being out of synchronization.

12. The device of claim 8, wherein the one or more processors are further to:
generate a user interface that includes a high level model representing the impacted reference, the impacted configuration block, and the impacted high level object; and
provide the user interface for display.

13. The device of claim 8, wherein the one or more processors, to perform the one or more actions, are to:
enable a user to selectively accept the out-of-band configuration change, reject the out-of-band configuration change, or merge the out-of-band configuration change with the configuration based on determining whether to reject the out-of-band configuration change, accept the out-of-band configuration change, or merge the out-of-band configuration change with the configuration.

14. The device of claim 8, wherein the configuration is associated with a security policy for the network device.

15. A non-transitory computer-readable medium storing a set of instructions, the set of instructions comprising:
one or more instructions that, when executed by one or more processors of a device, cause the device to:
receive a configuration of a network device,
wherein the configuration includes configuration blocks with references to high level objects;
receive an out-of-band configuration change from the network device,
wherein the out-of-band configuration change is a change to the configuration of the network device;
determine a difference between the out-of-band configuration change and the configuration;
identify an impacted high level object based on the difference between the out-of-band configuration change and the configuration;
determine an impacted reference and an impacted configuration block associated with the impacted high level object;
determine whether to reject the out-of-band configuration change, accept the out-of-band configuration change, or merge the out-of-band configuration change with the configuration based on the impacted high level object, the impacted reference, and the impacted configuration block; and
perform one or more actions based on determining whether to reject the out-of-band configuration change, accept the out-of-band configuration change, or merge the out-of-band configuration change with the configuration.

16. The non-transitory computer-readable medium of claim 15, wherein the one or more instructions, that cause the device to perform the one or more actions, cause the device to:
  modify the configuration, based on determining to accept the out-of-band configuration change and based on the out-of-band configuration change, to generate a modified configuration; and
  cause the modified configuration to be implemented by the network device.

17. The non-transitory computer-readable medium of claim 15, wherein the one or more instructions, that cause the device to perform the one or more actions, cause the device to:
  cause the out-of-band configuration change to be rejected by the network device based on determining to reject the out-of-band configuration change.

18. The non-transitory computer-readable medium of claim 15, wherein the one or more instructions, that cause the device to perform the one or more actions, cause the device to:
  merge the out-of-band configuration change with the configuration, based on determining to merge the out-of-band configuration change with the configuration, to generate a modified configuration; and
  cause the modified configuration to be implemented by the network device.

19. The non-transitory computer-readable medium of claim 15, wherein the one or more instructions, that cause the device to perform the one or more actions, cause the device to:
  create a new high level object, from the configuration and based on determining to accept the out-of-band configuration change, to generate a modified configuration; and
  cause the modified configuration to be implemented by the network device.

20. The non-transitory computer-readable medium of claim 15, wherein the one or more instructions, that cause the device to perform the one or more actions, cause the device to:
  create a new high level object from the configuration and based on determining to merge the out-of-band configuration change with the configuration;
  merge the impacted high level object and the new high level object to generate a modified configuration; and
  cause the modified configuration to be implemented by the network device.

* * * * *